Patented Nov. 29, 1949

2,489,763

UNITED STATES PATENT OFFICE 2,489,763

MODIFICATION OF PROLAMINES WITH GLYCOLS

John P. Dunne, New York, N. Y., assignor to Columbian Carbon Company, New York, N. Y., a corporation of Delaware No Drawing. Application July 19, 1947, Serial No. 762,211

14 Claims. (Cl. 260—123)

This invention relates to a method for the production of modified prolamins which are characterized by increased miscibility with water and other desirable properties.

It is known in the art to prepare solutions of prolamins (e. g., zein), the prolamins being dissolved in aqueous ethanol, or in glycols or polyglycols. Such solutions have little or no tolerance for water, and the addition of sufficient water thereto causes precipitation of the prolamin. Prolamin emulsions or dispersions in water have also been made using soaps, particularly rosin soaps, sulfated oils, etc. However, such emulsions or dispersions may be prepared only in low solids content. Furthermore, such emulsions or dispersions are of limited stability.

It is therefore an object of this invention to provide a method for the modification of a prolamin to provide a product of increased miscibility with water.

It is another object of this invention to provide a method for the production of a modified prolamin which is infinitely miscible with water.

It is also an object of this invention to provide a method for the production of a modified zein which is infinitely miscible with water.

It is a further object of this invention to provide a method for the modification of a prolamin, particularly zein, to form a product which is infinitely miscible with water and which may be incorporated into water to form stable solutions which are not affected by air, light or the normal temperatures of storage.

The foregoing and other objects are accomplished in accordance with the present invention by heating a prolamin in contact with a mixture containing certain glycols or polyglycols and a strong alkali or strong acid.

For a more complete understanding of the present invention, reference is made to the following examples, which are to be considered not limitative of the invention.

Example I 712 gms. of propylene glycol was charged to a reaction flask equipped with a reflux condenser, and 80 gms. of zein and 8 gms. of dry sodium hydroxide were mixed therein. The temperature of the reaction mixture was then raised to 110° C., and held at that temperature for one-half hour. At this point, a sample of the reaction mixture could be diluted with up to about an equal weight of water at room temperature without precipitating zein from the solution. After the reaction mixture had been heated for an additional one-half hour at the same temperature, it was miscible with water in all proportions at room temperature, and aqueous solutions thereof were stable over an extended period of time.

Example II 712 gms. of propylene glycol was charged to a reaction flask equipped with a reflux condenser, and 80 gms. of zein and 8 ml. of concentrated (94% by weight) sulfuric acid were added thereto with stirring. The temperature of the reaction mixture was then raised to 110° C., and held at that temperature over a period of several hours. At the end of the first hour, a sample of the reaction mixture could be diluted with about 1.2 times its weight of water at room temperature without precipitation of the zein. At the end of the second hour of heating, a sample of the reaction mixture tolerated about 1.5 times its weight of water at room temperature without precipitation of the zein, and after three hours of heating the corresponding figure was about 2.2.

The foregoing examples illustrate the method of the present invention for the modification of a prolamin to render it more completely miscible with water by heating the prolamin in admixture with a glycol or polyglycol and a strong alkali or strong acid. In the examples, zein was the specific prolamin which was modified. However, for zein there may be substituted in the examples any other prolamin, such as gliadin, hordein or kafarin, or mixtures of the aforementioned prolamins.

Furthermore, in place of the propylene glycol employed in the examples, there may be substituted any other glycol or polyglycol which is infinitely miscible with water at 20° C. ( e. g., ethylene glycol, trimethylene glycol, diethylene glycol, dipropylene glycol, triethylene glycol, tetraethylene glycol, tripropylene glycol, "Polyethylene Glycol 200" (a proprietary mixture of polyethylene glycols having an average molecular weight of 190–210), "Polyethylene Glycol 400" (a proprietary mixture of polyethylene glycols having an average molecular weight of 380–420 and a freezing range of 4–10° C.), "Polyethylene Glycol 600" (a proprietary mixture of polyethylene glycols having an average molecular weight of 570–630 and a freezing range of 20–25° C.), etc.), or polyethylene glycol which is not infinitely miscible with water at 20° C. but which has a molecular weight below about 1600 (e. g., "Carbowax Compound 1000" (a proprietary mixture of polyethylene glycols having an average molecular weight of 950–1050 and a freezing range of 35–40° C.), "Carbowax Compound 1500" (a proprietary mixture of polyethylene glycols having an average molecular weight of 500–600 and a freezing range of 35–40° C.), "Carbowax Compound 1540" (a proprietary mixture of polyethylene glycols having an average molecular weight of 1300–1600 and a freezing range of 40–50° C.), etc.), or mixtures thereof.

The relative proportions of prolamin and glycol or polyglycol may be varied over a wide range, depending upon the particular prolamin employed, the particular glycol or polyglycol used, the characteristics desired in the reaction product, etc. Thus, when propylene glycol and refined zein are employed, the minimum amount of glycol required is approximately 1.6 parts by weight per part of zein, if a product which is completely miscible with water is to result from the reaction. Somewhat greater amounts of glycol and polyglycol of higher molecular weight than propylene glycol are required if the same effect is to be produced. With ethylene glycol a somewhat smaller amount thereof may be used if a similar result is to be obtained using zein.

As the examples illustrate, the modification of the prolamin may be effected using as a catalyst sodium hydroxide or sulfuric acid. However, in place of the sodium hydroxide there may be substituted any other strongly alkaline material, such as potassium hydroxide, lithium hydroxide, tetramethyl-ammonium hydroxide, etc., or materials which decompose under the reaction conditions to yield strongly alkaline materials, such as sodium acetate, potassium oxalate, sodium citrate, sodium lactate, sodium formate, etc., or mixtures thereof. Furthermore, in place of the sulfuric acid used in the examples, there may be substituted any other strong acid, such as hydrochloric acid, nitric acid, hydrofluoric acid, fluorosulfonic acid, boron trifluoride, benzene sulfonic acid, o-toluene sulfonic acid, m-toluene sulfonic acid, p-toluene sulfonic acid, alpha-naphthalene sulfonic acid, beta-naphthalene sulfonic acid, trichloroacetic acid, oxalic acid, sodium acid sulfate, potassium acid sulfate, etc., or materials which under the reaction conditions decompose to yield strong acids, such as sodium bifluoride, potassium bifluoride, ammonium bifluoride, ammonium sulfate, aluminum chloride, etc., or mixtures thereof. In general, the reaction mixture should preferably contain from about 2 to about 20 parts of strongly basic or strongly acid material per 100 parts of prolamin contained therein.

In the examples, the modification of the prolamin was effected by heating the reaction mixture at 110° C. for a period of time. A wide range of reaction temperatures may be employed in practicing the method of the present invention, such temperatures generally being in the range from about 80 to about 120° C., and preferably from about 100–120° C. The temperature of the reaction mixture should not be allowed to rise substantially above about 120° C., as some decomposition of the prolamin may take place at higher temperatures.

The reaction of the prolamin and the glycol or polyglycol may be carried out in any suitable vessel, such as a jacketed dough mixer, a jacketed kettle preferably equipped with a reflux condenser, etc. The preferred method of effecting the reaction is to add the prolamin and strongly alkaline or strongly acidic material to the glycol or polyglycol while the glycol or polyglycol is heated and agitated, the addition of the prolamin and strongly alkaline or strongly acidic material being made when the temperature of the glycol or polyglycol has reached 60–80° C. When the proportion of glycol or polyglycol to prolamin is less than about three to one by weight, it is preferred to use a closed, jacketed mixer because of the relatively high viscosity of the mixture.

The period of time during which the reaction mixture is heated will depend upon various factors, such as the particular reactants employed and their relative proportions, the reaction temperature, the properties desired in the final product, etc. The water tolerance usually varies from about 40 to about 50% (i. e., from about 40 to about 50 gms. of water per 100 gms. of reaction mixture at room temperature) when the prolamin first completely dissolves in the glycol or polyglycol to infinite water tolerance after from one to four hours of heating at 110° C. The reaction time required to attain infinite water tolerance is somewhat reduced as the amount of glycol or polyglycol and/or strongly alkaline and strongly acidic material present is increased.

Prolamins which have been modified in accordance with the method described herein are valuable compositions of matter in that they have increased or total miscibility in water, and hence may be used in the production of improved printing inks, water-dilutable paints and varnishes, adhesives, as binders for pigments and fillers in molding compositions, as a modifier and extender for synthetic resins such as phenol-formaldehyde resins, and for other purposes.

As a specific illustration of the use of the composition of the present invention, a letterpress ink which is very stable on storage and which flash-dries rapidly, has good hiding power and prints sharp and clean may be prepared by mixing in the known manner 78 parts of the final product of Example I, 1 part of milori blue, 20 parts of carbon black and 1 part of methyl violet. Furthermore, an ink which is suitable for gravure and intaglio printing and which is non-inflammable, prints sharp and clean and dries at high speed may be prepared by mixing 76 parts of the final product of Example II, 3 parts of milori blue, 20 parts of carbon black, 1 part of methyl violet, and 100 parts of water. In addition, pigments other than carbon black may be incorporated into the composition of the present invention to form a printing ink, for example, by mixing 78.8 parts of the final product of Example I, 10.0 parts of calcium carbonate and 11.2 parts of lithol red.

I claim:

1. The method for the modification of a prolamin to render it more completely miscible with water which comprises heating the prolamin in admixture with a mixture which consists essentially of at least one material selected from the group consisting of glycols and polyglycols which are infinitely miscible with water at 20° C. and polyethylene glycols which are not infinitely miscible with water at 20° C. but which have a molecular weight below about 1600 and at least one material selected from the group consisting of strong acids and compounds which under the reaction conditions decompose to yield strong acids, the heating being conducted at a temperature within the range from about 80 to about 120° C. for from about one to about four hours.

2. The method of claim 1 in which the heating is effected within the temperature range from about 100 to about 120° C.

3. The method of claim 1 in which the prolamin is zein.

4. The method for the modification of a prolamin to render it more completely miscible with water which comprises heating the prolamin in admixture with a mixture which consists essentially of at least one material selected from the group consisting of glycols and polyglycols which are infinitely miscible with water at 20° C. and polyethylene glycols which are not infinitely miscible with water at 20° C. but which have a molecular weight below about 1600 and a strong acid, the heating being conducted at a temperature within the range from about 80 to about 120° C. for from about one to about four hours.

5. The method of claim 4 in which the strong acid is sulfuric acid.

6. The method for the modification of a prolamin to render it more completely miscible with water which comprises heating the prolamin in admixture with a mixture which consists essentially of at least one glycol which is infinitely miscible with water at 20° C. and at least one material selected from the group consisting of strong acids and compounds which under the reaction conditions decompose to yield strong acids, the heating being conducted at a temperature within the range from about 80 to about 120° C. for from about one to about four hours.

7. The method of claim 6 in which the prolamin is zein.

8. The method for the modification of zein to render it more completely miscible with water which comprises heating the zein in admixture with a mixture which consists essentially of at least one glycol which is infinitely miscible with water at 20° C. and a strong acid, the heating being conducted at a temperature within the range from about 80 to about 120° C. for from about one to about four hours.

9. The method of claim 8 in which the strong acid is sulfuric acid.

10. The method for the modification of zein to render it more completely miscible with water which comprises heating the zein in admixture with a mixture which consists essentially of propylene glycol and sulfuric acid, the heating being conducted at a temperature within the range from about 80 to about 120° C. for from about one to about four hours.

11. The method for the modification of zein to render it more completely miscible with water which comprises heating the zein in admixture with a mixture which consists essentially of at least 1.6 parts by weight of propylene glycol per part by weight of zein and from about 0.02 to about 0.20 part by weight of sulfuric acid per part by weight of zein, the heating being conducted at a temperature within the range from about 80 to about 120° C. for from about one to about four hours.

12. The method of claim 11 in which the heating is effected within the temperature range from about 100 to about 120° C.

13. The product produced in accordance with the process of claim 12.

14. The product produced in accordance with the process of claim 1.

JOHN P. DUNNE.

REFERENCES CITED

The following references are of record in the file of this patent:

UNITED STATES PATENTS

| Number | Name | Date |
|---|---|---|
| 2,298,548 | Coleman | Oct. 13, 1942 |
| 2,402,128 | Evans | June 18, 1946 |